(12) United States Patent
Naumovitz et al.

(10) Patent No.: US 8,728,209 B2
(45) Date of Patent: May 20, 2014

(54) METHOD AND SYSTEM FOR REDUCING ENERGY REQUIREMENTS OF A $CO_2$ CAPTURE SYSTEM

(75) Inventors: Joseph P. Naumovitz, Lebanon, NJ (US); Michael Koch, Oslo (NO)

(73) Assignee: ALSTOM Technology Ltd, Baden (CH)

( * ) Notice: Subject to any disclaimer, the term of this patent is extended or adjusted under 35 U.S.C. 154(b) by 258 days.

(21) Appl. No.: 13/196,172

(22) Filed: Aug. 2, 2011

(65) Prior Publication Data

US 2012/0060689 A1 Mar. 15, 2012

Related U.S. Application Data

(60) Provisional application No. 61/382,205, filed on Sep. 13, 2010.

(51) Int. Cl.
*B01D 53/14* (2006.01)

(52) U.S. Cl.
USPC .................. 95/173; 95/174; 95/183; 95/193; 95/209; 95/227; 95/236; 95/161; 95/176; 96/234; 96/242

(58) Field of Classification Search
None
See application file for complete search history.

(56) References Cited

U.S. PATENT DOCUMENTS

| | | | |
|---|---|---|---|
| 2,106,734 A | 2/1935 | Gollmar | |
| 2,043,109 A | 6/1936 | McKee et al. | |
| 2,487,576 A | 11/1949 | Meyers | |
| 2,608,461 A | 8/1952 | Frazier | |
| 2,878,099 A | 3/1959 | Breuing et al. | |
| 3,255,233 A | 6/1966 | Kunze et al. | |
| 3,923,955 A | 12/1975 | Fattinger | |
| 4,152,217 A * | 5/1979 | Eisenberg et al. | ................ 203/2 |
| 4,515,760 A | 5/1985 | Lang et al. | |
| 4,847,057 A | 7/1989 | Brugerolle et al. | |

(Continued)

FOREIGN PATENT DOCUMENTS

| | | |
|---|---|---|
| AU | 648129 | 7/1992 |
| AU | 678622 | 6/1995 |

(Continued)

OTHER PUBLICATIONS

The International Search Report and the Written Opinion of the International Searching Authority, PCT/US2011/049493 dated Dec. 20, 2011.

(Continued)

*Primary Examiner* — Duane Smith
*Assistant Examiner* — Pankti Patel
(74) *Attorney, Agent, or Firm* — Robert D. Crawford (57) ABSTRACT

A method for reducing energy requirements of a $CO_2$ capture system comprises: contacting a flue gas stream with a $CO_2$ lean absorbent stream in an absorber, thereby removing $CO_2$ from the flue gas and providing a $CO_2$ rich absorbent stream; heating a first portion of the $CO_2$ rich absorbent stream using heat from the $CO_2$ lean absorbent stream, and providing the heated first portion of the $CO_2$ rich absorbent stream to a regenerator; providing a second portion of the $CO_2$ rich absorbent stream to the regenerator, wherein the heated first portion is hotter than the second portion and the heated first portion is provided to the regenerator at a lower elevation in the regenerator relative to that of the second portion.

6 Claims, 6 Drawing Sheets

(56) References Cited

U.S. PATENT DOCUMENTS

| | | |
|---|---|---|
| 4,977,745 A | 12/1990 | Heichberger |
| 4,999,031 A | 3/1991 | Gerhardt et al. |
| 5,067,972 A | 11/1991 | Hemmings et al. |
| 5,137,550 A | 8/1992 | Hegarty et al. |
| 5,186,916 A | 2/1993 | Nevels |
| 5,318,758 A | 6/1994 | Fujii |
| 5,378,442 A | 1/1995 | Fujii et al. |
| 5,427,759 A | 6/1995 | Heitmann |
| 5,453,115 A | 9/1995 | Vuletić |
| 5,462,583 A | 10/1995 | Wood et al. |
| 5,599,508 A | 2/1997 | Martinelli et al. |
| 5,648,053 A | 7/1997 | Mimura et al. |
| 5,700,311 A | 12/1997 | Spencer |
| 5,756,058 A | 5/1998 | Watanabe et al. |
| 5,832,712 A | 11/1998 | Rønning et al. |
| 5,853,680 A | 12/1998 | Iijima et al. |
| 5,979,180 A | 11/1999 | Lebas et al. |
| 6,027,552 A | 2/2000 | Ruck et al. |
| 6,210,467 B1 | 4/2001 | Howard |
| 6,348,088 B2 | 2/2002 | Chung |
| 6,372,023 B1 | 4/2002 | Kiyono et al. |
| 6,458,188 B1 | 10/2002 | Mace |
| 6,485,547 B1 | 11/2002 | Iijima |
| 6,497,852 B2 | 12/2002 | Chakravarti et al. |
| 6,506,350 B2 | 1/2003 | Cooper et al. |
| 6,759,022 B2 | 7/2004 | Hammer et al. |
| 6,764,530 B2 | 7/2004 | Iijima |
| 7,022,296 B1 | 4/2006 | Khang et al. |
| 7,083,662 B2 | 8/2006 | Xu et al. |
| 7,128,777 B2 | 10/2006 | Spencer |
| 7,160,456 B2 | 1/2007 | Järventie |
| 7,255,842 B1 | 8/2007 | Yeh et al. |
| 7,846,240 B2 * | 12/2010 | Gal et al. ................. 95/159 |
| 2003/0045756 A1 | 3/2003 | Mimura et al. |
| 2003/0140786 A1 | 7/2003 | Iijima |
| 2004/0123736 A1 | 7/2004 | Torres, Jr. et al. |
| 2004/0126294 A1 | 7/2004 | Cooper et al. |
| 2005/0169825 A1 | 8/2005 | Cadours et al. |
| 2006/0178259 A1 | 8/2006 | Schubert et al. |
| 2006/0204425 A1 | 9/2006 | Kamijo et al. |
| 2007/0006565 A1 | 1/2007 | Fleischer et al. |
| 2008/0072762 A1 | 3/2008 | Gal |
| 2008/0178733 A1 | 7/2008 | Gal |
| 2008/0184887 A1 * | 8/2008 | Mak ........................ 95/174 |
| 2008/0307968 A1 | 12/2008 | Kang et al. |
| 2009/0101012 A1 | 4/2009 | Gal et al. |
| 2009/0155889 A1 | 6/2009 | Handagama et al. |
| 2009/0282977 A1 | 11/2009 | Koss |
| 2011/0072969 A1 * | 3/2011 | Lechnick et al. ........... 95/199 |
| 2011/0120315 A1 * | 5/2011 | Iijima et al. ............... 96/242 |

FOREIGN PATENT DOCUMENTS

| | | |
|---|---|---|
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| CN | 201244430 | 5/2009 |
| CN | 201558659 | 8/2010 |
| DE | 469840 | 12/1928 |
| DE | 2832493 | 7/1978 |
| DE | 3633690 | 4/1988 |
| DE | 10 2005 03383 | 1/2007 |
| EP | 0243778 | 11/1987 |
| EP | 0502596 | 9/1992 |
| EP | 0553643 | 8/1993 |
| EP | 0588178 | 3/1994 |
| EP | 1 736 231 | 12/2006 |
| EP | 1759756 | 3/2007 |
| GB | 271852 | 5/1926 |
| GB | 871207 | 6/1961 |
| GB | 899611 | 6/1962 |
| GB | 2331526 | 5/1999 |
| JP | 10 202054 | 8/1998 |
| JP | 11 137960 | 5/1999 |
| KR | 100703999 B1 | 3/2007 |
| SU | 512785 | 5/1976 |
| SU | 1567251 | 5/1990 |
| WO | 98/47604 | 10/1998 |
| WO | 02/09849 | 2/2002 |
| WO | 02/089958 | 11/2002 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | 2006/118795 | 11/2006 |
| WO | 2008/072979 | 6/2008 |
| WO | 2008/094777 | 8/2008 |
| WO | 2008/101293 | 8/2008 |
| WO | 2008/144918 | 12/2008 |
| WO | 2010/053683 | 5/2010 |
| WO | 2010/086039 | 8/2010 |
| WO | 2010/120527 | 10/2010 |

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of CO2, SO2 and NOx," Int. J. Environmental Tech. and Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliminary Results" International Journal of Thermodynamics, International Centre for Applied Thermodynamics, Istanbul, TR, vol. 7, No. 4, Dec. 1, 2004, pp. 173-181.

"Semi-batch absorption and regeneration studies for CO2 capture by aqueous ammonia", Fuel Processing Technology, vol. 86, No. 14-15, Oct. 1, 2005, pp. 1533-1546.

Office Action of the Intellectual Property Office of Taiwan for TW Application 100132728 issued Oct. 21, 2013.

* cited by examiner

METHOD AND SYSTEM FOR REDUCING ENERGY REQUIREMENTS OF A CO$_2$ CAPTURE SYSTEM

The present utility patent application claims priority to U.S. Provisional Application No. 61/382,205 filed on Sep. 13, 2010.

FIELD

The disclosed subject matter relates to a system and method for removing carbon dioxide (CO$_2$) from a flue gas stream. More specifically, the disclosed subject matter relates to a system and method for reducing energy requirements of a CO$_2$ capture system.

BACKGROUND

In the combustion of a fuel, such as coal, oil, peat, waste, etc., in a combustion plant, such as a power plant, a hot process gas is generated, often referred to as a flue gas, containing, among other components, carbon dioxide, CO$_2$. The negative environmental effects of releasing carbon dioxide into the atmosphere have been widely recognized, and have resulted in the development of systems and processes adapted for removing carbon dioxide from the hot process gas generated in the combustion of the above mentioned fuels.

In various systems/methods for CO$_2$ removal, an absorber vessel is provided in which an ionic solution is contacted in counter current flow with a flue gas stream containing CO$_2$. One system and process previously disclosed is a single-stage chilled ammonia based system and method for removal of CO$_2$ from a post-combustion flue gas stream. Such a system and process has been proposed and taught in published US Patent Application Publication 2008/0072762 entitled Ultra Cleaning of Combustion Gas Including the Removal of CO$_2$, which is incorporated by reference herein in its entirety. In the chilled ammonia system, the ionic solution is composed of, for example, water and ammonium ions, bicarbonate ions, carbonate ions, and/or carbamate ions. In other systems, it is contemplated that the ionic solution may be an amine. It is also contemplated that the ionic solution may be promoted by an enzyme (e.g., carbonic anhydrase) or amine (e.g., piperazine).

The absorber vessel is configured to receive a flue gas stream (FG) originating from, for example, the combustion chamber of a fossil fuel fired boiler. It is also configured to receive a CO$_2$ lean ionic solution supply from a regeneration system. The lean ionic solution is introduced into the vessel via a liquid distribution system while the flue gas stream FG is also received by the absorber vessel via a flue gas inlet.

The ionic solution is put into contact with the flue gas stream via a gas-liquid contacting device (hereinafter, mass transfer device, MTD) used for mass transfer and located in the absorber vessel and within the path that the flue gas stream travels from its entrance via an inlet at a bottom portion of the absorber vessel to its exit at a top portion of the absorber vessel. The MTD may be, for example, one or more commonly known structured or random packing materials, or a combination thereof.

The ionic solution is introduced at the top of the MTD and falls downward through the MTD coming into contact with the flue gas stream FG that is rising upward (opposite the direction of the ionic solution) and through the MTD.

Once contacted with the flue gas stream, the ionic solution acts to absorb CO$_2$ from the flue gas stream, thus making the ionic solution "rich" with CO$_2$ (rich solution). The rich ionic solution continues to flow downward through the mass transfer device and is then collected in the bottom of the absorber vessel. The rich ionic solution is then regenerated via a regenerator system to release the CO$_2$ absorbed by the ionic solution from the flue gas stream. The CO$_2$ released from the ionic solution may then be output to storage or other predetermined uses/purposes. Once the CO$_2$ is released from the ionic solution, the ionic solution is said to be "lean". The lean ionic solution is then again ready to absorb CO$_2$ from a flue gas stream and may be directed back to the liquid distribution system whereby it is again introduced into the absorber vessel.

While CO$_2$ capture systems are effective in removing CO$_2$ resulting from power generation, in doing so they consume power that would otherwise be used elsewhere. In other words, CO$_2$ capture systems can place a "parasitic load" on the power generation plant. Thus, there is an ongoing need to reduce the parasitic load that CO$_2$ capture systems place on the power generation plant.

SUMMARY

According to aspects illustrated herein, there is provided a method for reducing energy requirements of a CO$_2$ capture system, the method comprising: contacting a flue gas stream with a CO$_2$ lean absorbent stream in an absorber, thereby removing CO$_2$ from the flue gas and providing a CO$_2$ rich absorbent stream; heating a first portion of the CO$_2$ rich absorbent stream using heat from the CO$_2$ lean absorbent stream, and providing the heated first portion of the CO$_2$ rich absorbent stream to a regenerator; providing a second portion of the CO$_2$ rich absorbent stream to the regenerator, wherein the heated first portion is hotter than the second portion and the heated first portion is provided to the regenerator at a lower elevation in the regenerator relative to that of the second portion.

In one embodiment, the method further comprises: separating a gaseous CO$_2$ from the heated first portion prior to providing the heated first portion to the regenerator; and compressing the gaseous CO$_2$ and providing the compressed gaseous CO$_2$ to the regenerator at a lower elevation in the regenerator relative to that of the liquid portion. In another aspect, after separating the gaseous CO$_2$ from the heated first portion and prior to providing the first portion to the regenerator, the first portion is further heated using heat from the CO$_2$ lean absorbent stream. In yet another aspect, the method further comprises: washing residual absorbent from the flue gas stream leaving the absorber; stripping CO$_2$ from the residual absorbent to provide overhead CO$_2$ vapors; and combining overhead CO$_2$ vapors with the gaseous CO$_2$ prior to compressing the gaseous CO$_2$.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
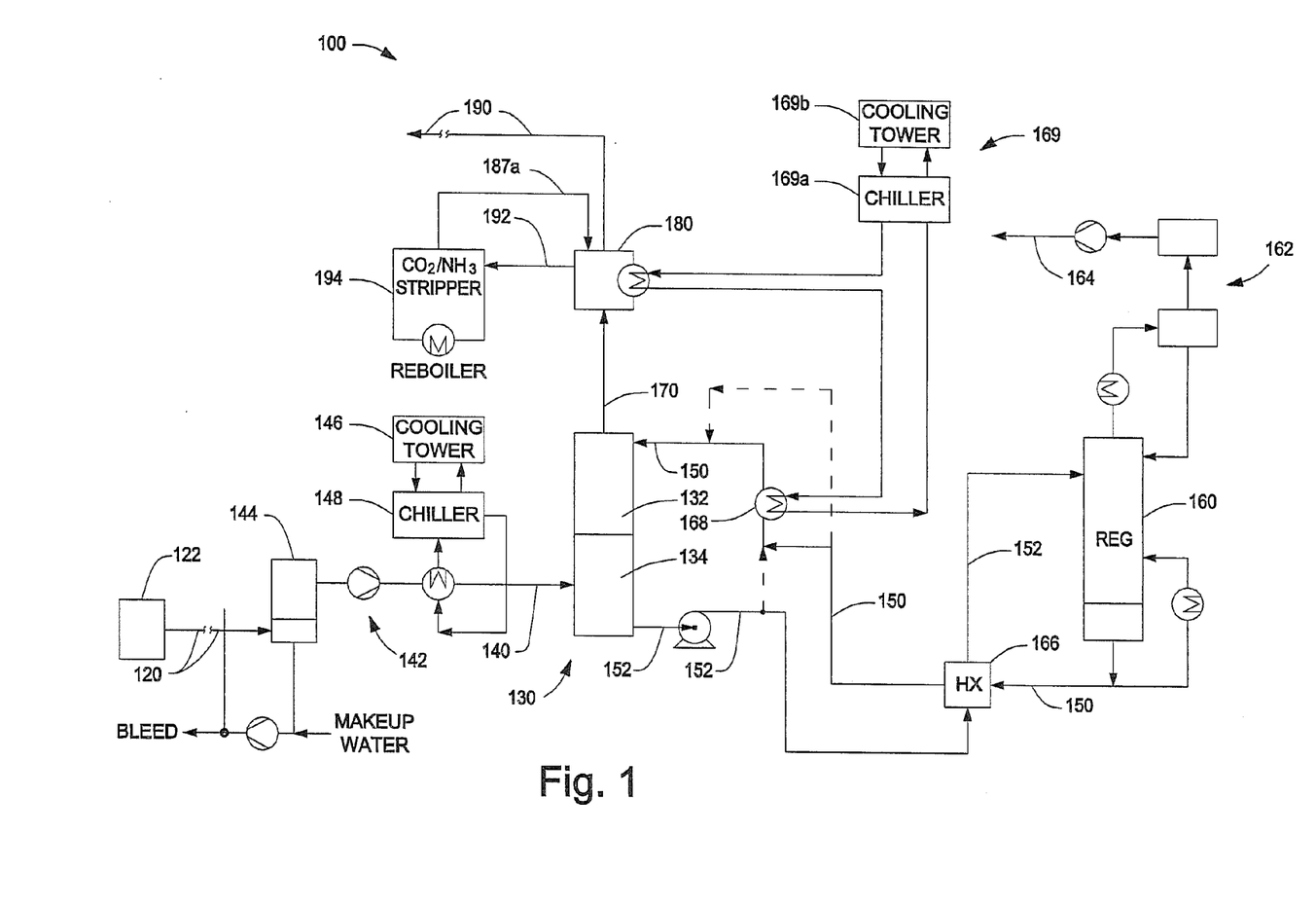
FIG. 1 is a schematic representation of a system used to reduce an amount of CO$_2$ in a flue gas stream.

As shown in FIG. 1, a system 100 for reducing an amount of carbon dioxide ($CO_2$) present in a flue gas stream includes several devices and processes for removing a variety of contaminants from a flue gas stream 120 generated by combustion of a fuel in a furnace 122. The system of FIG. 1 may be as described in U.S. patent application Ser. No. 12/556,043, filed Sep. 9, 2009, entitled "Chilled Ammonia Based $CO_2$ Capture System with Water Wash System", which is incorporated by reference in its entirety herein. As shown in FIG. 1, system 100 includes an absorbing system 130 to absorb $CO_2$ from the flue gas stream 120 and, in one embodiment, a cooled flue gas stream 140.

Cooled flue gas stream 140 is generated by passing the flue gas stream 120 generated by the combustion of a fuel in a furnace 122 to a cooling system 142. Before introduction to the cooling system 142, flue gas stream 120 may undergo treatment to remove contaminants therefrom, such as, for example, a flue gas desulfurization process and particulate collector (not shown).

Cooling system 142 may be any system that can produce a cooled flue gas stream 140, and may include, as shown in FIG. 1, a direct contact cooler 144, one or more cooling towers 146 and one or more chillers 148, that wash and/or scrub the flue gas stream 120, capture contaminants, and/or lower the moisture content of the flue gas stream. However, it is contemplated that cooling system 142 may include less or more devices than are shown in FIG. 1.

In one embodiment, the cooled flue gas stream 140 has a temperature that is lower than the ambient temperature. In one example, cooled flue gas stream 140 may have a temperature between about zero degrees Celsius and about twenty degrees Celsius (0° C.-20° C.). In another embodiment, the cooled flue gas stream 140 may have a temperature between about zero degrees Celsius and about ten degrees Celsius (0° C.-10° C.).

As shown in FIG. 1, cooling system 142 is in communication with the absorbing system 130. It is contemplated that the cooling system 142 may be in direct communication with the absorbing system 130, i.e., there are no additional processes or devices between the cooling system and the absorbing system. Alternatively, the cooling system 142 may be in indirect communication with the absorbing system 130, i.e., there may be additional processes or devices between the cooling system and the absorbing system, such as, but not limited to, particulate collectors, mist eliminators, and the like.

Absorbing system 130 facilitates the absorption of $CO_2$ from the cooled flue gas stream 140 by contacting the cooled flue gas stream with an ammoniated solution or slurry ($CO_2$ lean stream) 150. Ammoniated solution or slurry 150 may include dissolved ammonia and $CO_2$ species in a water solution and may also include precipitated solids of ammonium bicarbonate.

In one embodiment, absorbing system 130 includes a first absorber 132 and a second absorber 134. However, it is contemplated that absorbing system 130 may include more or less absorbers as illustrated in FIG. 1. Additionally, it is contemplated that first absorber 132 and/or second absorber 134 may have one or more stages therein for absorbing $CO_2$ from the cooled flue gas stream 140.

The ammoniated solution or slurry 150 introduced to the absorbing system 130 may be recycled and/or provided by a regeneration tower 160. As shown in FIG. 1, ammoniated solution or slurry 150 may be introduced to the absorbing system 130 at a location within the first absorber 132, however it is contemplated that the ammoniated solution or slurry may also be introduced at a location within the second absorber 134 or any of the absorbers present in the absorbing system 130. Regeneration tower 160 is in direct or indirect communication with absorbing system 130.

Figure 2:
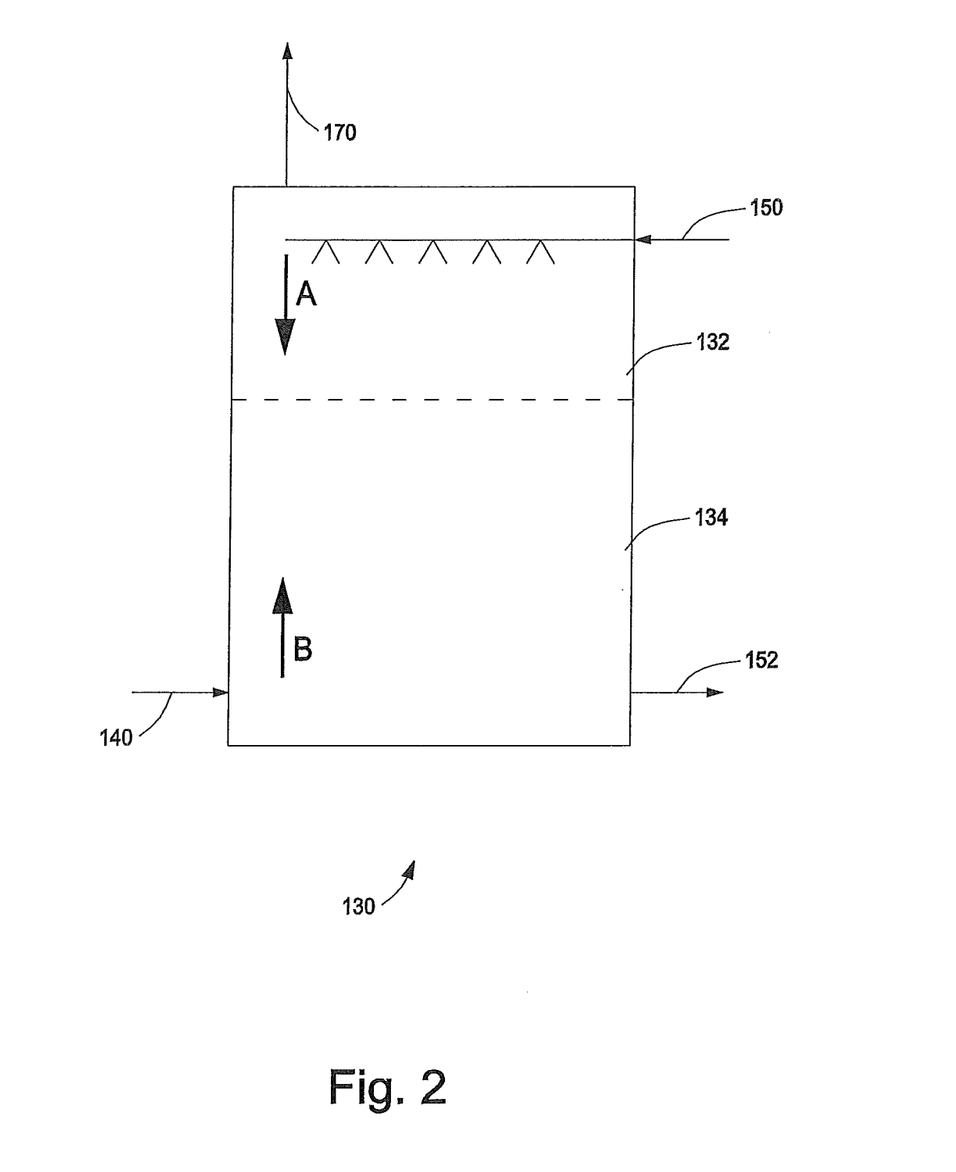
FIG. 2 is an illustration of one embodiment of an absorbing system utilized in the system depicted in FIG. 1.

As shown in more detail in FIG. 2, ammoniated slurry or solution 150 is introduced to absorbing system 130, e.g., in first absorber 132 or second absorber 134, in a direction A that is countercurrent to a flow B of cooled flue gas stream 140. As the ammoniated slurry or solution 150 contacts cooled flue gas stream 140, $CO_2$ present in the cooled flue gas stream is absorbed and removed therefrom, thereby forming a $CO_2$ rich stream 152. At least a portion of the resulting $CO_2$ rich stream 152 is transported from the absorbing system 130 to regeneration tower 160.

It is contemplated that either a portion or all of $CO_2$ rich stream 152 may be transferred to regeneration tower 160. As shown in FIG. 1, at least a portion of $CO_2$ rich stream 152 may pass through a buffer tank 162, a high pressure pump 164 and a heat exchanger 166 prior to being introduced to regeneration tower 160. In one embodiment, a separate portion of the $CO_2$ rich stream 152 may be passed from absorbing system 130 through a heat exchanger 168 where it is cooled prior to being returned to the absorbing system. Heat exchanger 168 is in communication with a cooling system 169. As shown in FIG. 1, the cooling system 169 may have a direct contact chiller 169a as well as a cooling tower 169b; however, it is recognized the cooling system 169 may have more or less devices than what is illustrated herein. The $CO_2$ rich stream 152 is cooled prior to it being introduced into the absorbing system 130 with the ammoniated solution or slurry 150.

Additionally, while not shown in FIG. 1 or 2, it is also contemplated that the portion of the $CO_2$ rich stream 152 may be transferred directly to the regeneration tower 160 without passing through the buffer tank 162, the high pressure pump 164 and the heat exchanger 166.

Regeneration tower 160 regenerates the $CO_2$ rich stream 152 to form the ammoniated slurry or solution 150 that is introduced to the absorbing system 130. Regeneration tower 160 facilitates the regeneration of used ammoniated solution or slurry, i.e., the $CO_2$ rich stream 152, which has been through the absorbing system 130 and removed $CO_2$. Regeneration is performed by providing heat at the bottom of the regeneration tower 160. Regeneration of the $CO_2$ rich stream 152 is also performed at high pressure.

The capacity of the ammoniated solution or slurry 150 to absorb $CO_2$ from the cooled flue gas stream 140 depends on, e.g., the ammonia concentration in the ammoniated solution or slurry, the $NH3/CO_2$ mole ratio, and the temperature and pressure of the absorbing system 130. In one embodiment, the $NH3/CO_2$ mole ratio for absorption of $CO_2$ is between about 1.0 and about 4.0. In another embodiment, the $NH3/CO_2$ mole ratio for absorption of $CO_2$ is between about 1.0 and about 3.0. Additionally, in one embodiment, the absorbing system 130 operates at a low temperature, particularly at a temperature less than about twenty degrees Celsius (20° C.). In one embodiment, the absorbing system 130 operates at a temperature between about zero degrees Celsius and about twenty degrees Celsius (0° and 20° C.). In another embodiment, the absorbing system 130 operates at a temperature between about zero degrees Celsius and about ten degrees Celsius (0° and 10° C.).

As shown in FIGS. 1 and 2, and discussed above, after cooled flue gas stream 140 contacts ammoniated solution or slurry 150, $CO_2$ rich stream 152 is formed, as well as an ammonia-containing flue gas stream 170. Typically, the concentration of ammonia in the ammonia-containing flue gas stream 170 will vary depending on the system, the amount of ammoniated solution or slurry 150 introduced to the absorbing system 130, and the amount of the $CO_2$ present in the cooled flue gas stream 140, and therefore, the ammonia-containing flue gas stream may contain any concentration of ammonia. In one embodiment, the concentration of ammonia in the ammonia-containing flue gas stream 170 may be between about five hundred parts per million (500 ppm) and about thirty thousand parts per million (30,000 ppm).

It is contemplated that the concentration of ammonia present in the ammonia-containing flue gas stream 170 may be measured. For example, the ammonia concentration in the ammonia-containing flue gas stream 170 may be measured by, for example, a dragger tube or Fourier transform infrared spectroscopy (FTIR). While not shown, the amount or concentration of ammonia in the ammonia-containing flue gas stream 170 may be measured at any point prior to its introduction to a wash vessel 180. Measurement of the amount or concentration of the ammonia in the ammonia-containing flue gas stream 170 may assist the operator of system 100 in removing or reducing the amount of ammonia in the ammonia-containing flue gas stream.

As shown in FIG. 1, ammonia-containing flue gas stream 170 is introduced to the wash vessel 180. In one embodiment, wash vessel 180 reduces an amount of ammonia present in the ammonia-containing flue gas stream 170 and forms a reduced ammonia-containing flue gas stream 190. However, it is contemplated that wash vessel 180 may be used in conjunction with other systems and methods that generate a flue gas stream containing ammonia, i.e., the wash vessel may be used in a system that does not contain absorbing system 130 and/or cooling system 142.

The reduced ammonia-containing flue gas stream 190 may be released to the environment. The reduced ammonia-containing flue gas stream 190 may be directly released to the environment from wash vessel 180. However, it is contemplated that the reduced ammonia-containing flue gas stream may be further processed prior to being emitted to the environment, for example, it may be washed in an acidic solution to further reduce contaminant content. Additionally, and while not shown in FIG. 1, it is contemplated that the amount of ammonia present in the reduced ammonia-containing flue gas stream 190 may be measured after the reduced ammonia-containing flue gas stream exits the wash vessel 180.

Figure 3:
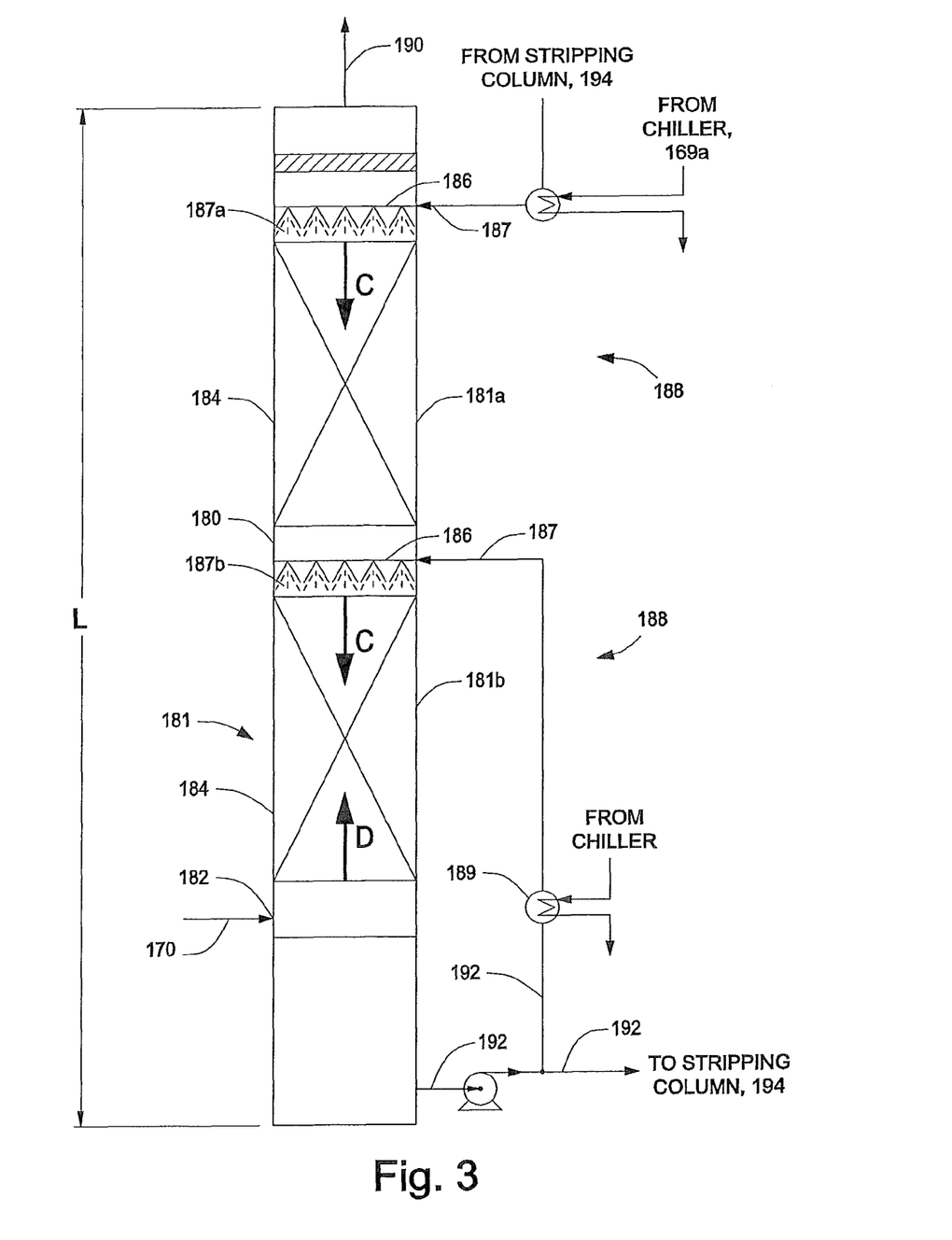
FIG. 3 is an illustration of one embodiment of a wash vessel utilized in the system depicted in FIG. 1.

In one embodiment, wash vessel 180 is configured to accept ammonia-containing flue gas stream 170. As shown in FIG. 3, wash vessel 180 may have an opening 182 at a bottom of the wash vessel that allows the ammonia-containing flue gas stream 170 to flow into the wash vessel. While the opening 182 is shown at the bottom of the wash vessel 180, it is contemplated that the opening may be at any point in the wash vessel and may vary from system to system depending on the application.

Wash vessel 180 may have one or more absorption stages, shown generally at 181, to absorb ammonia from the ammonia-containing flue gas stream 170. In one embodiment, as shown in FIG. 3, wash vessel 180 includes two absorption stages, a first absorption stage 181a and a second absorption stage 181b. The wash vessel 180 is not limited in this regard as it is contemplated that the wash vessel may have more or less absorption stages. Each of the absorption stages 181, e.g., first and second absorption stages 181a and 181b, may include a mass transfer device 184, a spray head system 186 and a liquid delivery path 188.

The mass transfer device 184 may include packing, such as, for example, random packing, hydrophilic packing, and/or structural packing. Random packing is generally known in the art and refers to packing material introduced to the absorption stage in an un-organized fashion. Examples of random packing include, but are not limited to plastic, metal and/or ceramic packing material offered in different sizes, e.g., material having varying diameters, for example, diameters ranging between about 2.5 centimeters (2.5 cm) to about 7.6 centimeters (7.6 cm) (about 1 inch to about 3 inches). Random packing material is available from many suppliers, including, but not limited to Jaeger Products Inc. (Houston, Tex., United States). Random packing material may also include wood. Hydrophilic packing includes, but is not limited to polypropylene bags.

Structural packing is generally known in the art and refers to packing material that is arranged or organized in a specific fashion. Typically, structural packing is arranged in a manner to force fluids to take a complicated path, thereby creating a large surface area for contact between the liquid and gas. Structural packing includes, but is not limited to structures made of metal, plastic, wood, and the like. It is contemplated that different packing materials facilitate ammonia removal or reduction at different flow rates of a liquid into the wash vessel 180. Additionally, it is contemplated that the different packing materials may provide more suitable pressure drops.

In one embodiment, one of the absorption stages 181 of the wash vessel 180 includes random packing material as the mass transfer device 184 and another of the absorption stages 181 of the wash vessel 180 includes structural packing as the mass transfer device. For example, first absorption stage 181a may include random packing material as the mass transfer device 184 and second absorption stage 181b may include structural packing as the mass transfer device. It is contemplated that the ammonia-containing flue gas stream 170 enters the wash vessel 180 and passes through the second absorption stage 181b prior to passing through the first absorption stage 181a.

As shown in FIG. 3, in each of the absorption stages 181, the mass transfer device 184 is located beneath the spray head system 186. Each of the spray head system 186 in wash vessel 180 sprays a liquid 187 into the absorption stages 181. The liquid 187 is transported to the spray head system 186 via the liquid delivery path 188. The liquid delivery path 188 is a conduit that transports the liquid 187 to the spray head system 186. The liquid 187 may be any liquid suitable to facilitate the removal of ammonia from the ammonia-containing flue gas stream 170. An example of liquid 187 is water, which is known to absorb, i.e., dissolve, ammonia through interactions between the ammonia and the water.

In one particular embodiment, liquid 187 introduced to the first absorption stage 181a is liquid 187a, e.g., water provided by a stripping column 194. The liquid 187 provided to the second absorption stage 181b is liquid 187b, which is water-containing low concentration ammonia and $CO_2$ recycled from the bottom of the wash vessel 180 and passed through a heat exchanger 189.

The liquid 187 is introduced at the top of each absorption stage 181, e.g., liquid 181a is provided to the top of first absorption stage 181a and liquid 187b is provided to the top of second absorption stage 181b, of the wash vessel 180. The liquid 187 travels in a direction C down a length L of the wash vessel 180, which is countercurrent to a direction D that the ammonia-containing flue gas stream 170 travels up the length L of the wash vessel 180. As will be appreciated, the liquid 187 travels in direction C by virtue of gravity, while the ammonia-containing flue gas stream 170 travels in direction D by virtue of several factors, including pressure drops within the wash vessel 180.

As the liquid 187 travels in the direction C, it passes through the mass transfer devices 184 in each of the absorption stages 181. Likewise, as the ammonia-containing flue gas stream 170 travels in direction D, it passes through the mass transfer devices 184 in each of the absorption stages 181.

As the liquid 187 travels in direction C down the length L of the wash vessel 180, the ammonia concentration in the liquid increases, thereby forming an ammonia-rich liquid 192. Conversely, as the ammonia-containing flue gas stream 170 travels in a direction D up a length, e.g., the length L, of the wash vessel 180, the ammonia concentration in the ammonia-containing flue gas stream decreases thereby forming the reduced ammonia-containing flue gas stream 190.

For example, liquid 187a is introduced at the top of wash vessel 180 through a spray head system 186 over the first absorption stage 181a and travels in a direction C down the length L of the wash vessel. The concentration of ammonia present in the liquid 187a exiting the first absorption stage 181a is higher than the ammonia concentration of the liquid 187a entering the first absorption stage 181a since the liquid has contacted the ammonia-containing flue gas stream 170 that travels in direction D up the length L of the wash vessel and absorbed ammonia therefrom. In this embodiment, a greater percentage of ammonia in the ammonia-containing flue gas stream 170 is absorbed by the liquid 187a that flows from the first absorption stage 181a to the second absorption stage 181b as well as the liquid 187b that provided to the second absorption stage since the ammonia-containing flue gas stream is entering the wash vessel 180 at the bottom is untreated and therefore has the highest concentration of ammonia.

It should be appreciated that the amount of ammonia removed from the ammonia-containing flue gas stream 170 varies from system to system and application to application. It is contemplated that the system is designed in a manner that the ammonia concentration in the reduced ammonia containing flue gas stream 170 is low and close to an equilibrium concentration of ammonia in the gas relative to the vapor pressure of the ammonia in the liquid. The equilibrium concentration of ammonia in the flue gas stream 170 may be as low as below ten parts per million (10 ppm) and typically in the range of between about zero parts per million (0 ppm) to about two hundred parts per million (200 ppm). In one embodiment, the reduced ammonia containing flue gas stream 190 contains at least about seventy percent (70%) less ammonia as compared to a level of ammonia in the ammonia-containing flue gas stream 170. In another embodiment, the reduced ammonia containing flue gas stream 190 contains at least about seventy five percent (75%) less ammonia as compared to a level of ammonia in the ammonia-containing flue gas stream 170. In yet a further embodiment, the reduced ammonia containing flue gas stream 190 contains at least about eighty percent (80%) less ammonia as compared to a level of ammonia in the ammonia-containing flue gas stream 170. In another embodiment, the reduced ammonia containing flue gas stream 190 contains at least about eighty five (85%) less ammonia as compared to a level of ammonia in the ammonia-containing flue gas stream 170. It is contemplated that the level of ammonia in the reduced ammonia containing flue gas stream 190 may be about ninety percent (90%), ninety five percent (95%), ninety nine percent (99%) or ninety nine and a half percent (99.5%) less than the level of ammonia in the ammonia-containing flue gas stream 170.

A flow rate of liquid 187 suitable to reduce the amount of ammonia in the flue gas varies from system to system. In one embodiment, the flow rate is suitable to reduce an amount of ammonia in the flue gas to an amount close to the equilibrium concentration and typically to below two hundred parts per million (200 ppm) in the flue gas stream. In another embodiment, the flow rate is suitable to reduce an amount of ammonia in the flue gas from about two thousand parts per million (2000 ppm) to between about seventy parts per million and about one hundred parts per million (70-100 ppm). In another embodiment, the flow rate of the liquid 187 is between about 1.8 liters per minute (1.8 lpm, or about 0.5 gallons per minute) to about 7.5 liters per minute (7.5 lpm or about 2 gallons per minute) per one thousand cubic feet per minute (1000 cfm) of flue gas.

Still referring to FIG. 3, the liquid 187 falls to the bottom of the wash vessel 180 and is removed therefrom as ammonia-rich liquid 192. As shown in FIG. 3, in one embodiment, a portion of the ammonia-rich liquid 192 is recycled to the wash vessel 180 as liquid 187 and a portion of the ammonia-rich liquid is sent to the stripping column 194 (shown in FIG. 1). For example, a portion of the ammonia-rich liquid 192 is cooled in a heat exchanger 189 and recycled to second absorption stage 181b as liquid 187b. While not illustrated, it is contemplated that a portion of the ammonia-rich liquid 192 may be recycled from the bottom of the wash vessel 180 to first absorption stage 181a as liquid 187a. Additionally, while not shown, it is contemplated that the entire amount of the ammonia-rich liquid 192 may be sent to the stripping column 194 and then returned to the wash vessel 180 as liquid 187a.

Still referring to FIG. 3, the portion of ammonia-rich liquid 192 sent to stripping column 194 is regenerated to form liquid 187a, which is introduced via spray head system 186 in first absorption stage 181a. In the stripping column 194, the ammonia, as well as other contaminants, such as $CO_2$, is removed from the ammonia-rich liquid 192 to form the liquid 187a, which may be water, or water having, for example, trace contaminants of ammonia. When introduced in this manner, the liquid 187a that is introduced to the first absorption stage 181a is referred to as "once through liquid" since it is "clean liquid" that has not been recycled from the bottom of the wash vessel 180.

In one embodiment, stripping column 194 utilizes steam to remove ammonia, as well as other contaminants, from the ammonia-rich liquid 192 to form the liquid 187 that will be introduced to the wash vessel 180. However, it is contemplated that stripping column 194 may utilize other technology or techniques in order to remove the ammonia and other contaminants from the ammonia-rich liquid 192. In one embodiment, the stripping column 194 may be operated at vacuum conditions to reduce the temperature of the steam utilized in the stripping column.

While not shown in FIG. 1, it is contemplated that the ammonia removed from ammonia-rich liquid 192 may be re-utilized within system 100. For example, the ammonia may be introduced in the absorbing system 130 as ammoniated solution or slurry 150. However, it is contemplated that the ammonia may be utilized at other points inside and outside of system 100.

The amount of ammonia released to the environment is reduced or substantially eliminated by passing an ammonia-containing flue gas stream through wash vessel 180. The amount of liquid 187 introduced to the various absorption stages 181, e.g., liquid 187a introduced to the first absorption stage 181a and liquid 187b introduced to the second absorption stage 181b, may be controlled either continually or at predetermined time periods, to some extent by an operator, depending on, for example, the amount or flow of flue gas introduced to the wash vessel, a level of contaminants measured within emission from the system 100, and the like. The ability to control an amount of water used in the system may facilitate the savings of resources and reduce operating expenses.

Figure 4:
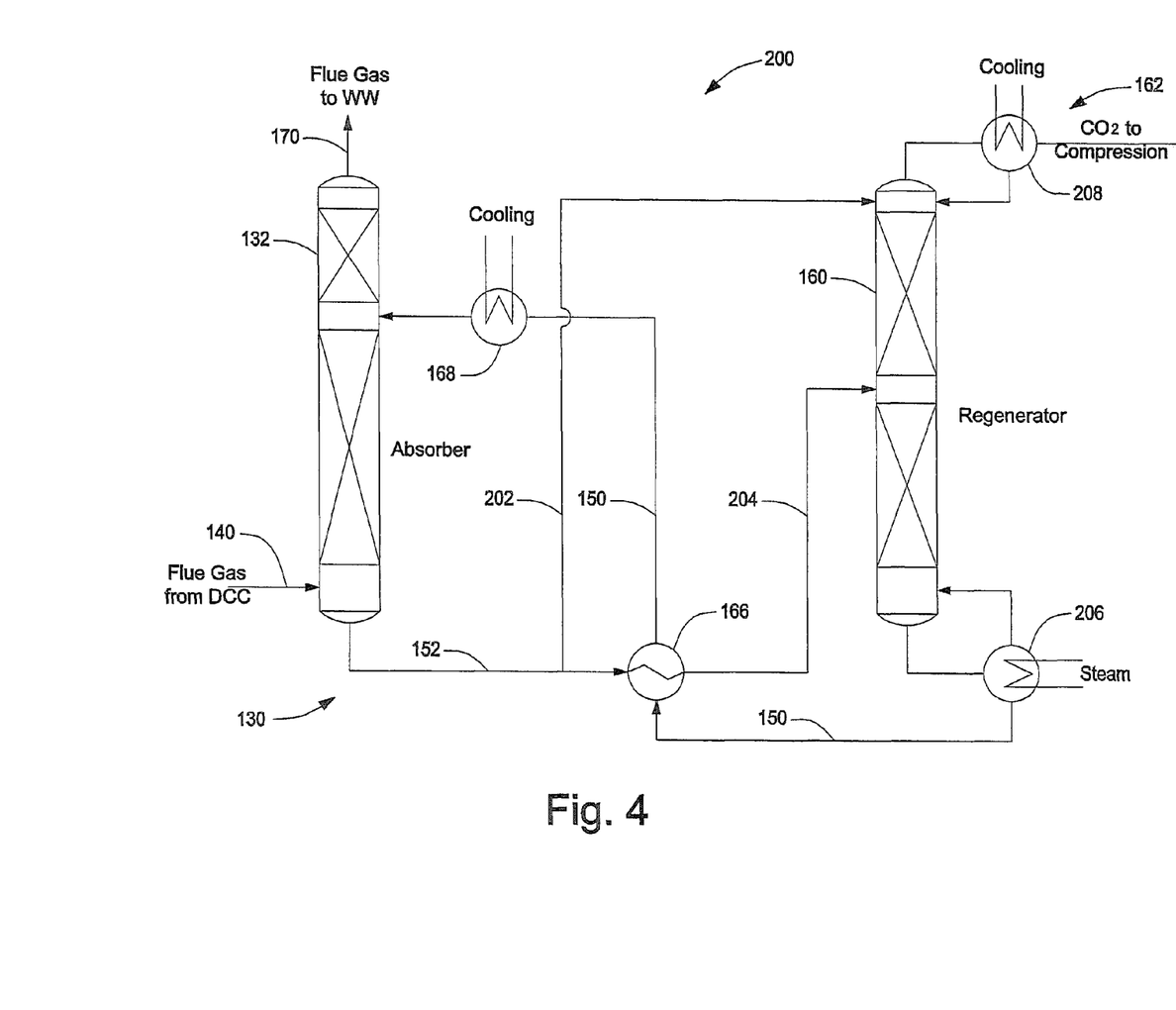
FIG. 4 is an illustration of one embodiment of the system including a multiple-feed regenerator arrangement.

FIG. 4 depicts a system 200 for reducing an amount of $CO_2$ present in a flue gas stream. System 200 may include the features of system 100, shown in FIG. 1, and like elements are numbered alike in the two figures. In system 200, the ionic solution may comprise, for example, water and ammonium ions, bicarbonate ions, carbonate ions, and/or carbamate ions, and the system 200 may be a chilled ammonia system. It is also contemplated that the ionic solution may be an amine. In either case, it is further contemplated that the ionic solution may be promoted by an enzyme (e.g., carbonic anhydrase) or amine (e.g., piperazine).

In system 200, a first portion of the $CO_2$ rich stream 152 from the absorber 132 (and or 134), indicated at 204, is provided to the regenerator vessel 160 after being heated in heat exchanger 166, while a second portion of the $CO_2$ rich stream 152, indicated at 202, is provided directly to the regenerator 16, bypassing heat exchanger 166. Because a portion 202 is bypassed around the heat exchanger 166, the amount of $CO_2$ rich stream 152 passing through heat exchanger 166 is reduced compared to the arrangement in FIG. 1. A reduction in the amount of $CO_2$ rich stream 152 that flows through heat exchanger 166 results in an increased temperature of the stream 204 compared to that of stream 202. The greater temperature may increase the amount of $CO_2$ that will be released (flashed) from the $CO_2$ rich stream 152 prior to reaching regenerator 160. Stream 202, which is cooler than stream 204, is introduced near the top of the regenerator 160, where $CO_2$ is released to compressor 208, while the relatively hotter stream 204 is introduced closer to the bottom of the regenerator 160. This arrangement promotes increased temperatures near the bottom of the regenerator, where the reboiler 206 provides heat to regenerate the $CO_2$ rich stream, and thus reduces the reboiler heat load.

Figure 5:
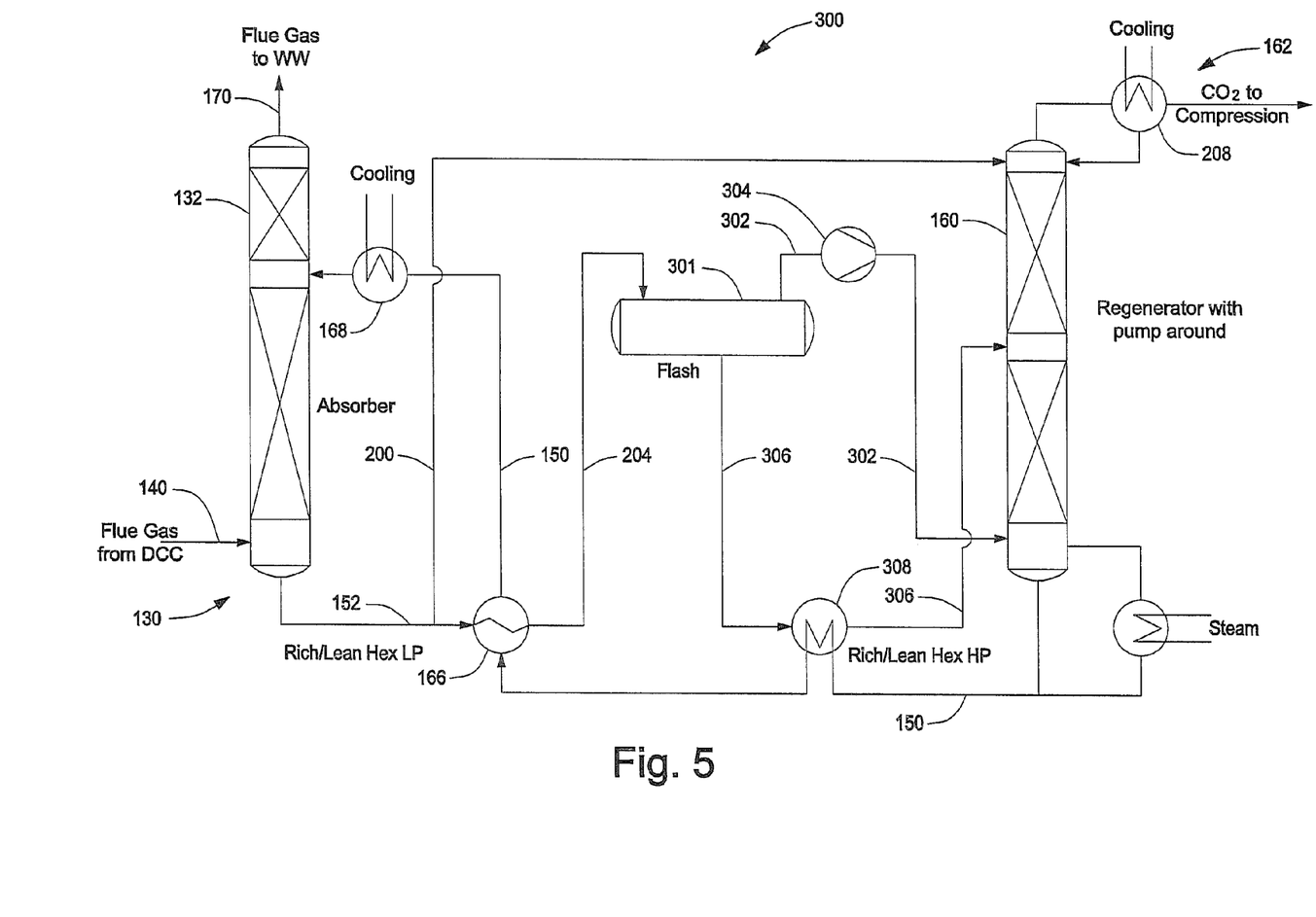
FIG. 5 is an illustration of one embodiment of the system of FIG. 4 including a high-pressure, multiple feed regenerator arrangement.

FIG. 5 depicts a system 300 for reducing an amount of $CO_2$ present in a flue gas stream, which is substantially similar to system 200 of FIG. 4, with like elements numbered alike. System 300 includes a flash drum (gas/liquid separator) 301 to separate the $CO_2$ gas that has flashed from the liquid portion of $CO_2$ rich stream 204. The $CO_2$ gas stream, indicated at 302, is provided to a compressor 304, which compresses the $CO_2$ gas stream 302 to above the pressure within the regenerator 160 (e.g., from about 10 bar to about 21 bar). The $CO_2$ gas stream 302, which increases in temperature due to compressor 304, is introduced near the bottom of the regenerator, where it serves to heat the $CO_2$ rich absorbent collected at the bottom of the regenerator 160.

The liquid portion of stream 204 leaves the flash drum 301 as stream 306, and is introduced to a heat exchanger 308, where stream 204 is heated by the $CO_2$ lean stream 150 before being introduced to the regenerator 160. It will be appreciated that stream 302 is relatively hotter than streams 306 and 200, and that stream 306 is relatively hotter than stream 200. As a result, this arrangement further promotes increased temperatures near the bottom of the regenerator 160, where the reboiler 206 provides heat to regenerate the $CO_2$ rich stream, and thus reduces the reboiler heat load. The use of heat from the heat exchangers 166 and 308, as well as the heat imparted by compressor 304, is believed to reduce up to 7-8% points on parasitic load of the system 300.

Figure 6:
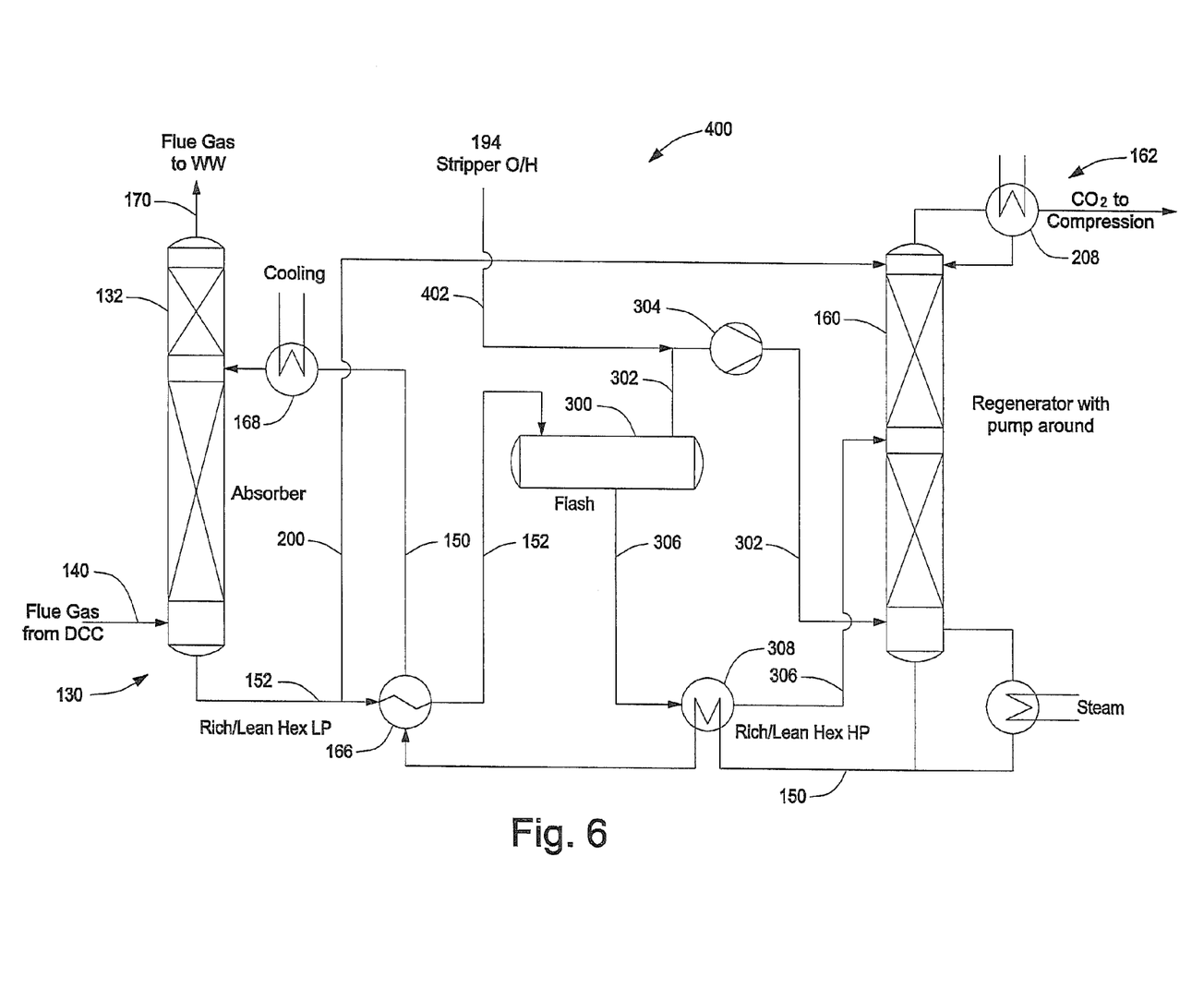
FIG. 6 is an illustration of one embodiment of the system of FIG. 5.

FIG. 6 depicts a system 400 for reducing an amount of $CO_2$ present in a flue gas stream, which is substantially similar to system 300 of FIG. 5, with like elements numbered alike. System 400 provides overhead $CO_2$ vapors removed from stripper 194 (FIG. 1) to compressor 304, in addition to the stream 302, to further increase the temperature of the compressed stream provided to the bottom of the regenerator 160.

The terms "first," "second," and the like, herein do not denote any order, quantity, or importance, but rather are used to distinguish one element from another. The terms "a" and "an" herein do not denote a limitation of quantity, but rather denote the presence of at least one of the referenced item.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for reducing energy requirements of a $CO_2$ capture system, the method comprising:
    contacting a flue gas stream with a $CO_2$ lean absorbent stream in an absorber, thereby removing $CO_2$ from the flue gas and providing a $CO_2$ rich absorbent stream;
    heating a first portion of the $CO_2$ rich absorbent stream using heat from the $CO_2$ lean absorbent stream, and providing the heated first portion of the $CO_2$ rich absorbent stream to a regenerator;
    providing a second portion of the $CO_2$ rich absorbent stream to the regenerator, wherein the heated first portion is hotter than the second portion and the heated first portion is provided to the regenerator at a lower elevation in the regenerator relative to that of the second portion;
    separating a gaseous $CO_2$ from the heated first portion prior to providing the heated first portion to the regenerator; and
    compressing the gaseous $CO_2$ and providing the compressed gaseous $CO_2$ to the regenerator at a lower elevation in the regenerator relative to that of the liquid portion.

2. The method of claim 1, further comprising:
    after separating the gaseous $CO_2$ from the heated first portion and prior to providing the first portion to the regenerator, further heating the first portion using heat from the $CO_2$ lean absorbent stream.

3. The method of claim 1, further comprising:
    washing residual absorbent from the flue gas stream leaving the absorber;
    stripping $CO_2$ from the residual absorbent to provide overhead $CO_2$ vapors; and
    combining overhead $CO_2$ vapors with the gaseous $CO_2$ prior to compressing the gaseous $CO_2$.

4. A system for reducing energy requirements of a $CO_2$ capture system, the system comprising:
    an absorber vessel to contact a gas stream, having $CO_2$, with a $CO_2$ lean absorbent stream therein, thereby removing $CO_2$ from the gas stream and providing a $CO_2$ rich absorbent stream;
    a heat exchanger to heat a first portion of the $CO_2$ rich absorbent stream using heat from the $CO_2$ lean absorbent stream, a regeneration vessel that receives the heated first portion of the $CO_2$ rich absorbent stream, and a second portion of the $CO_2$ rich absorbent stream which is cooler than the heated first portion;

a gas/liquid separator to separate a gaseous $CO_2$ from the liquid portion of the heated first portion prior to providing the heated first portion to the regeneration vessel; and a compressor to compress the separated gaseous $CO_2$ from the heated first portion;

wherein the compressed gaseous $CO_2$ is provided to the regeneration vessel at a lower elevation in the regeneration vessel relative to the separated liquid portion of the heated first portion, and the separated liquid portion of the heated first portion is provided at a lower elevation in the regeneration vessel relative to the second portion.

5. The system of claim 4, further comprising:

a second heat exchanger to heat the liquid portion of the heated first portion prior to being provided to the regeneration vessel.

6. The system of claim 4, further comprising:

a wash vessel to wash residual absorbent from the gas stream leaving the absorber vessel; and a stripping column to strip $CO_2$ from the residual absorbent to provide overhead $CO_2$ vapors;

wherein the overhead $CO_2$ vapors are combined with the gaseous $CO_2$ prior to compressing the gaseous $CO_2$.

* * * * *